United States Patent [19]

Schmidt et al.

[11] Patent Number: 4,653,715
[45] Date of Patent: Mar. 31, 1987

[54] WORK LOCATION FOR THE PROCESSING OF WORKPIECES

[75] Inventors: Helmut Schmidt; Anton Bodenmiller, both of Leutkirch; Alfred Straka, Isny, all of Fed. Rep. of Germany

[73] Assignee: Kaltenbach & Voigt GmbH & Co., Riss, Fed. Rep. of Germany

[21] Appl. No.: 733,134

[22] Filed: May 10, 1985

[30] Foreign Application Priority Data

Jun. 1, 1984 [DE] Fed. Rep. of Germany .................. 3420567515

[51] Int. Cl.$^4$ ............................... B08B 15/04
[52] U.S. Cl. ............................ 248/281.1; 248/122; 188/727
[58] Field of Search ............... 248/281.1, 123.1, 124, 248/125, 122, 276, 278, 280.1, 282, 283, 284, 289.1, 291, 292.1; 188/72.7

[56] References Cited

U.S. PATENT DOCUMENTS

| | | | |
|---|---|---|---|
| 1,613,541 | 1/1927 | Smith | 188/72.7 |
| 1,863,825 | 6/1932 | Blackmore | 188/72.7 |
| 3,473,057 | 1/1969 | Iverson | 248/283 |
| 3,666,299 | 5/1972 | Butler | 188/72.7 |
| 4,165,530 | 8/1979 | Sowden | 248/281.1 |
| 4,339,100 | 7/1982 | Heller | 248/123.1 |
| 4,447,031 | 5/1984 | Souder | 248/280.1 |
| 4,548,373 | 10/1985 | Komura | 248/280.1 |
| 4,568,052 | 2/1986 | Solomon | 248/281.1 |

FOREIGN PATENT DOCUMENTS 3222003 12/1983 Fed. Rep. of Germany .
3339658 8/1985 Fed. Rep. of Germany .

Primary Examiner—Reinaldo P. Machado
Assistant Examiner—Alvin Chin-Shue
Attorney, Agent, or Firm—Scully, Scott, Murphy & Presser

[57] ABSTRACT

A work location for the processing or finishing of workpieces, includes a protective plate movable through the intermediary of a holder from a protective work position screening the operating person into a non-screening parked position, wherein a braking device is associated with the holder for maintaining protective plate in a predetermined position.

28 Claims, 12 Drawing Figures

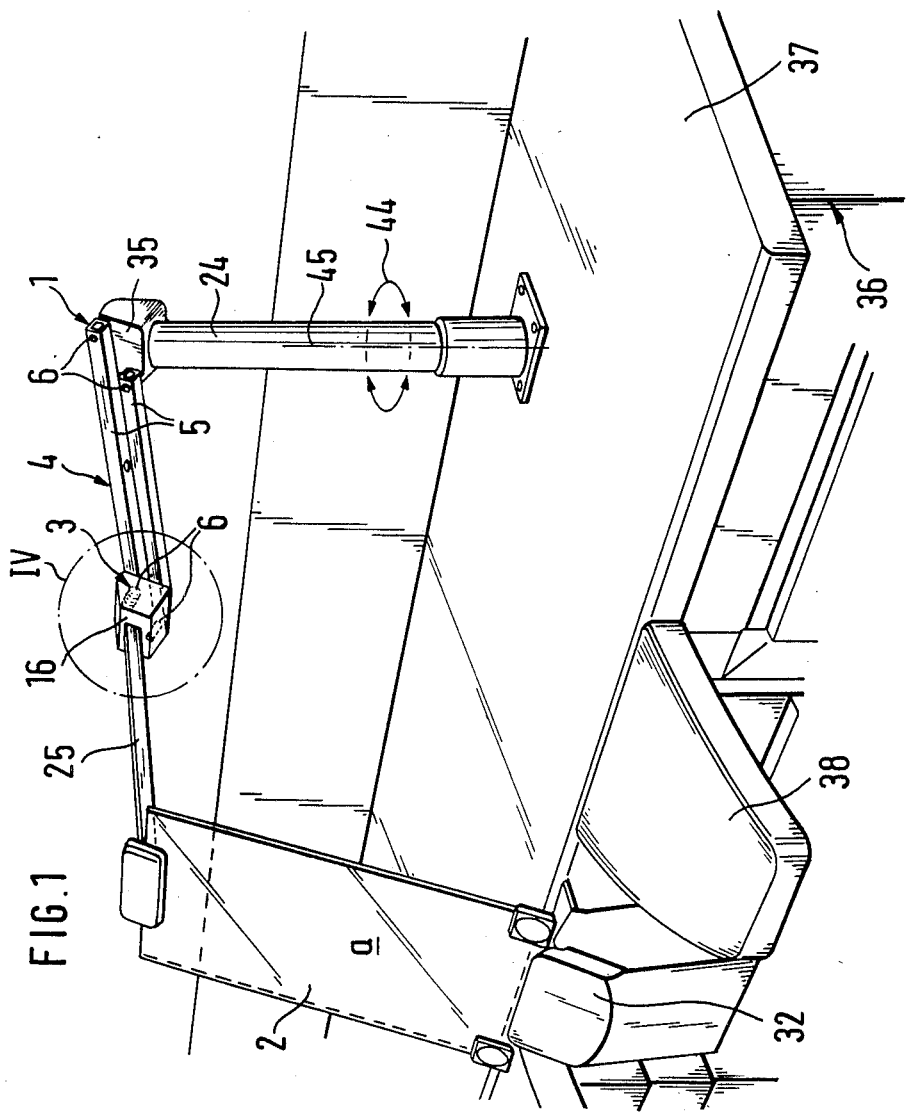

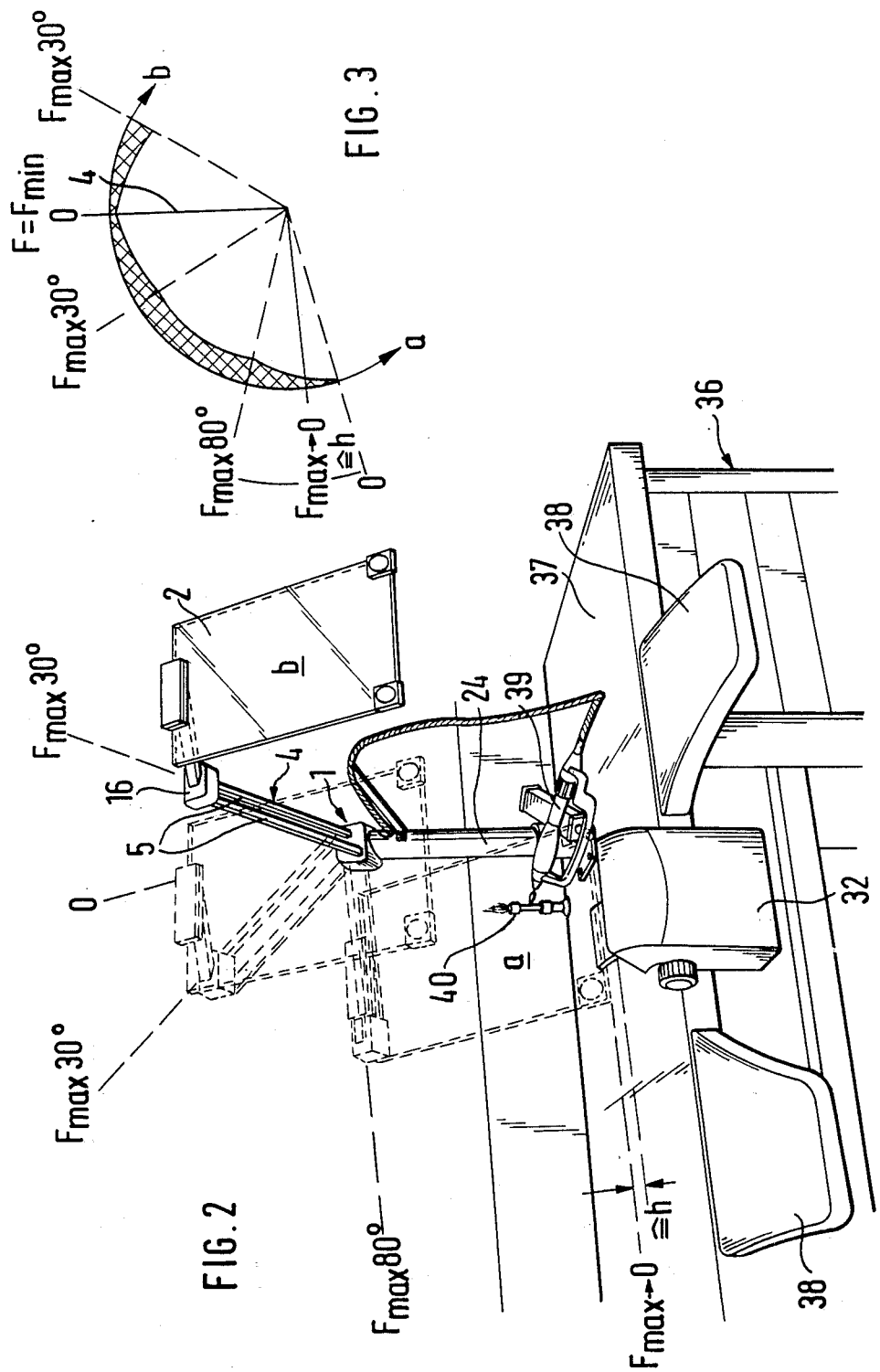

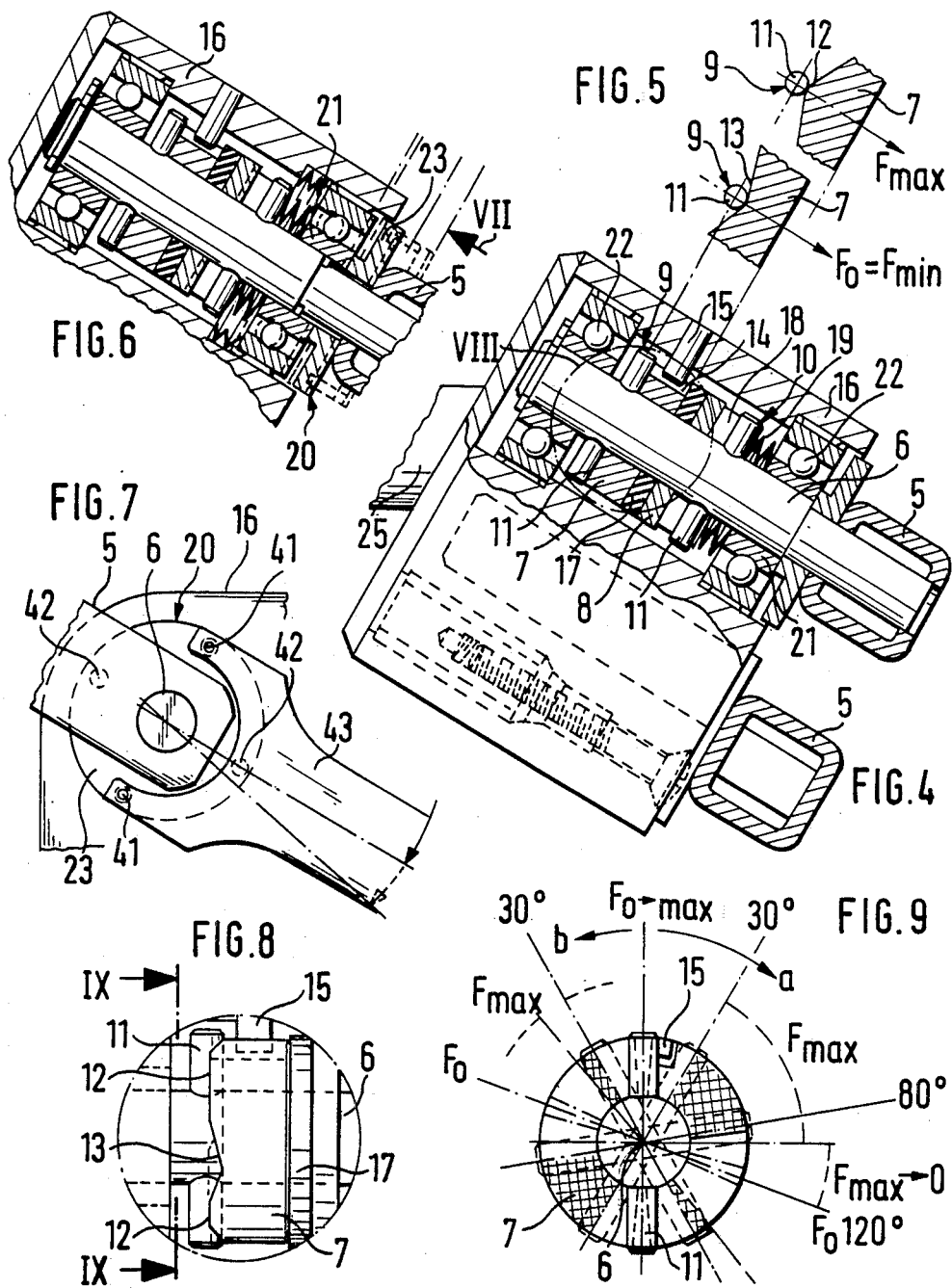

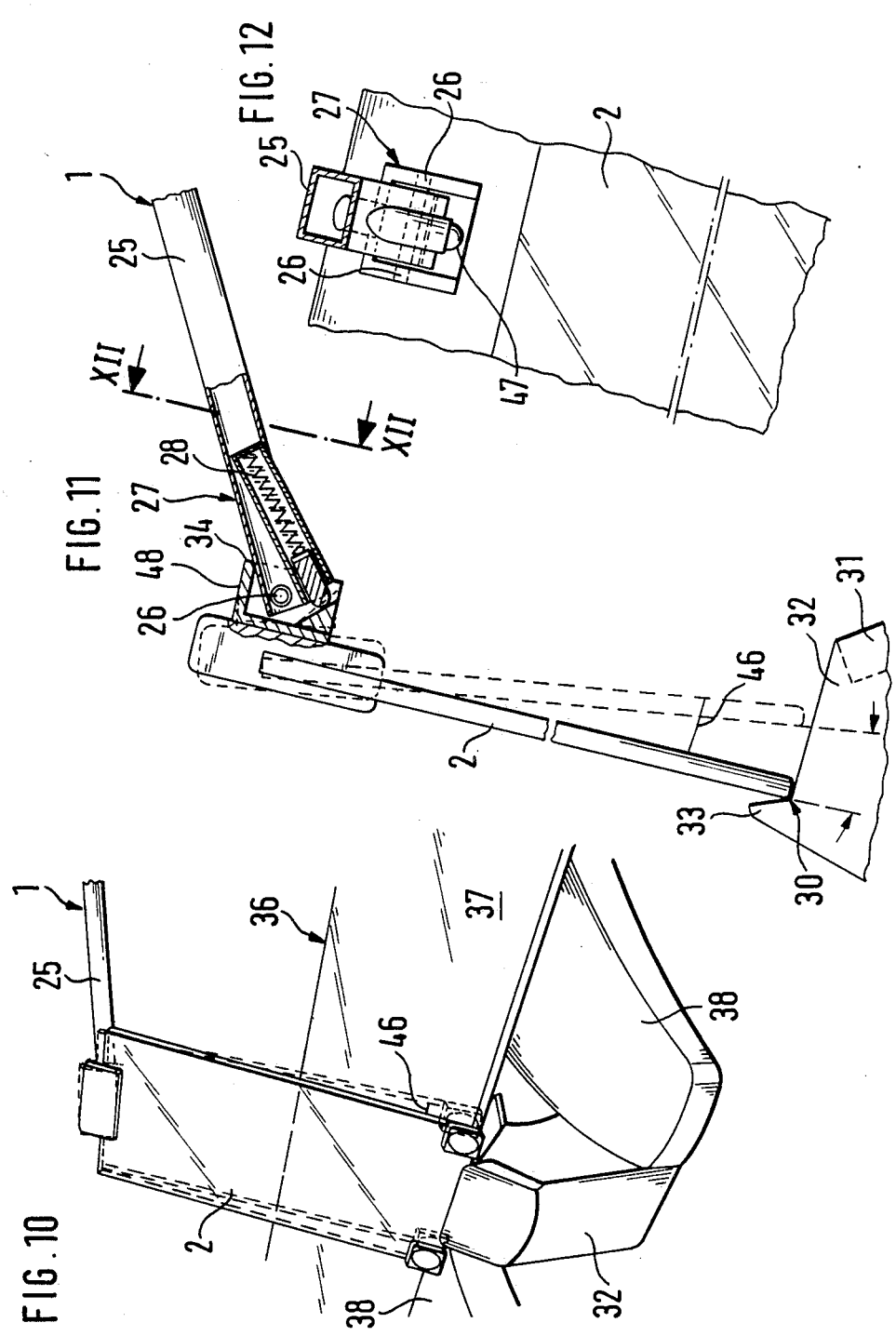

WORK LOCATION FOR THE PROCESSING OF WORKPIECES

BACKGROUND OF THE INVENTION

1. Field of the Invention

The present application relates to a work location for the processing or finishing of workpieces, including a protective plate movable through the intermediary of a holder from a protective work position screening the operating person into a non-screening parked position, wherein a braking device is associated with the holder for maintaining protective plate in a predetermined position.

2. Discussion of the Prior Art

As is illustrated in FIGS. 10 through 13 of German Patent Application No. P 33 39 658.2-15, a work location or place of that type is currently known in the state of the technology. In this work location pursuant to the state of the technology, the braking device which is associated with one axis of two parallel arms forming a holder in the shape of a pivoting arm, is formed by anchoring device tightenable through the intermediary of a clamping screw, such that the braking device possesses a constant clamping force after tightening of the clamping screw. This provides the result that prior to effecting any further movement of the protective plate, in effect, preceding any displacement of the pivoting arm, the braking device must again be loosened each time. Consequently, the pivoting cannot be manually displaced alone through mere pushing. When, for example, in an upwardly oriented position of the pivoting arm the clamping screw has been insufficiently tightened, the danger is present that through only minor force applications can the pivoting arm together with the protective plate swing downwardly in an unbraked manner from this unstable position of the pivoting arm.

SUMMARY OF THE INVENTION

Accordingly, it is an object of the present invention to provide a work location of the above-mentioned type in which the protective plate, without necessitating any special manually effected loosening or tightening of the braking device, can be moved from one position to another, without encountering the danger that the holder, including the protective plate, can fall down in an unbraked manner.

The advantages which are attained through the intermediary of the present invention can be essentially ascertained in that a maximum value $F_{max}$ and a minimum value $F_{min}$, which can also be a zero value $F_0$, can be associated with preferred positions of the protective plate, so that the protective plate is set into movement, for example, from an unstable $F_{min}$ corresponding position, by means of a light touch in order to by itself assume a predetermined position corresponding to $F_{max}$, for example the parking position, and to be automatically and gently restrained in this position. Eliminated thereby is any manual loosening and tightening of the braking device.

BRIEF DESCRIPTION OF THE DRAWINGS

Further modifications and advantages of the invention may now be ascertained from the following detailed description as set forth hereinbelow, taken in conjunction with the accompanying drawings illustrating exemplary embodiments of the invention; in which:

FIG. 1 illustrates a perspective view of a work location with a protective plate, holder and braking device, in which the protective plate is shown in its operative position;

FIG. 2 illustrates a perspective view of the worktable of FIG. 1, wherein the protective plate is shown by solid lines in its parked position, as well as by the upper phantom lines in an intermediate position and lower lines in an operative position;

FIG. 3 diagrammatically illustrates a representation of the cycle of the braking force of the braking device across the three positions as illustrated in FIG. 2, which encompass the path of movement of the protective plate;

FIG. 4 illustrates, on an enlarged scale, a sectional view through the braking device taken in the encircled portion IV in FIG. 1;

FIG. 5 illustrates two fragmentary sectional views of a braking element of the braking device;

FIG. 6 illustrates an embodiment modified with respect to that shown in FIG. 4;

FIG. 7 illustrates a plan view in the direction of arrow VII in FIG. 6;

FIG. 8 illustrates, on an enlarged scale, a sectional view of the encircled portion VIII in FIG. 4;

FIG. 9 illustrates a sectional view taken along line IX—IX in FIG. 8;

FIG. 10 illustrates a perspective view of the portion of the holder carrying the protective plate;

FIG. 11 illustrates a sectional view of the elements shown in FIG. 10; and

FIG. 12 illustrates a sectional view taken along line XII—XII in FIG. 11.

DETAILED DESCRIPTION

The work location, which encompasses a worktable 36 with a tabletop 37 and arm rests 38, serves for the processing or finishing, in particular, of dental workpieces, for the purpose of which they are illustrated in FIG. 2, by way of example, as a technicians handpiece 39 and a gas burner 40. In order to screen or protect the operating person, in particular this head, for example, from the flame of the gas burner 40 or from any particles which are produced or which fly about during the working, such as removing splinters, grinding dust or the like, there is provided a protective plate 2 which is movable by means of a holder 1 from an operative position "a" in which it screens the operating person into a non-screening parked position "b". The holder 1 has a braking device 3 associated therewith which maintains the protective plate 2 in a predetermined position. The protective plate 2 is suitably constituted of a transparent material, for example, of glass, in particular dual-safety glass.

The construction is such that the braking device 3 which is associated with the holder 1 possesses a braking force which, in at least one predetermined position of the protective plate 2, assumes a maximum value $F_{max}$, and in at least one other predetermined position of the protective plate 2 assumes a minimum value $F_{min}$. Herein the minimum value $F_{min}$ can also be a zero value $F_0$.

The holder 1 consists of a pivoting arm 4 which, at its free end, supports the protective plate 2 through the intermediary of an extension arm 25. The pivoting arm 4 consists of two parallel arms 5 forming a parallelogram linkage, wherein the braking device 3 is operatively associated with at least one of the pivoting axles 6 of the parallel arms 5. Basically, however, the braking device 3 can also be operatively associated with at least one of the parallel arms 5.

In particular from FIG. 4 can there be ascertained that the pivoting axle 6 is always secured against rotation with the associated parallel arm 5, and the braking device 3 consists of two mutually contacting disc-shaped braking members 7, 8, wherein the one braking member 7 is secured against rotation and the brake member 8 rotatably secured to the pivoting axle 6. The braking members 7, 8 are formed as ring-shaped brake discs and are mounted on the pivot axle 6, wherein the pivoting axle 6 incorporates two axially spaced stops 9, 10 secured therewith against rotation, and between which there are located the braking members 7, 8. The stops 9, 10 are formed as radial pins 11 which extend radially through the pivoting axle 6. In detail, the construction is such that the end surface of the braking member 7 secured against rotation and which faces the one stop 9 of the stops, will come into contact with the above-mentioned stop 9 upon rotation of the pivoting axle 6 caused by axial movements of the braking members 7, 8, and which are provided with wavilinearly sequences of protuberances 12 and depressions 13 contacting the stop 9. During the cooperation of the above-mentioned stop 9 with a protuberance 12, the braking force assumes the maximum value $F_{max}$, while upon the cooperation of the above-mentioned stop 9 with a depression 13, the braking force assumes a minimum value $F_{min}$. Between $F_{max}$ and $F_{min}$ there is afforded a gradual transition. The protuberances 12 can be configured grating or ridge-like and the depressions 13 groove-like and arranged diametrically along the end surface of the braking member 7.

The braking member 7, which is secured against rotation, is provided with at least one external axial groove 14 into which, in order to achieve securing against rotation, there engages a stationary guide pin 15, which is arranged on the internal wall of one of a housing 16 receiving the pivoting axle 6 including the braking members 7, 8. A layer 17 of a braking material in the type of a brake lining is arranged between the mutually contacting surfaces of the braking members 7, 8. Herein, the layer 17 is secured against rotation to the rotationally-secured braking member 7, for example, adhesively bonded thereto.

In particular from FIGS. 4 and 6 can there be ascertained that the braking member 8 which is rotatable with the pivoting axle 6, is in engagement secured against rotation but axially movably in conjunction with the stop 10 associated therewith. For this purpose, the ring-shaped braking member 8 which is rotatable with the pivoting axle 6 is provided with at least one internal axial groove 18 into which, in order to achieve the rotatability in conjunction with the pivoting axle 6, there engages the stop 10 associated with the braking member 8. As axial grooves 18, there are formed in the ring-shaped braking member 8 two diametrically oppositely located elongated apertures.

As further shown in FIGS. 4 and 6, a spring 19 is provided which maintains the two braking members 7, 8 in contact with each other, which spring is formed by a compression spring acting on the free end of the braking member 8 which is rotatable with the pivoting axle 6. The pivot axis 6 is supported in the housing 16 with the aid of two ball bearings 22, between which there are located the two braking members 7, 8 with the stops 9, 10, and the spring 19. The spring 19 is supported against the right-hand ball bearing 22 shown in FIG. 4.

Pursuant to FIGS. 6 and 7, there is provided an adjusting device 20 for varying the biasing force of the spring 19, which is formed by a collet or turn ring 23 acting through the inner race 21 of the right-hand ball bearing 22 against the spring 19, and which ring 23 is screwed into the housing 16 so as to encompass the pivoting axle 6. The turn ring 23 can be screwed together with an indexing element 43, as illustrated in FIG. 7, which with the aid of projections 41 engages into apertures 42 provided in the turn ring.

The pivoting arm 4 is articulated at its end remote from the protective plate 2 at the upper end of the columnar equipment stand 24 which can be rotatable about its axis 45 in the sence of circular arrow 44 as shown in FIG. 1. The braking device 3 is associated with one of the two pivoting axles 6 towards the protective plate. The extension arm 25, which carries the protective plate 2 at its free end, is rigidly fastened on the housing 16.

As can be ascertained from FIGS. 10 through 12, the holder 1 is provided with a positioning device 27 which tilts the protective plate 2 forwardly about a horizontal tilting axis 26 located in its upper region. Hereby, above all, there can be stabilized the operating position "a" which has been assumed by the protective plate 2. The tilting angle 46 of the protective plate 2 preferably consists of about 10° to 20°. The positioning device 27 possesses a positioning spring 28 which causes the pivotal movement of the protective plate 2, formed by a compression spring which is arranged below the tilting axis 26, supported on the extension arm 25, and which with its free end presses against the protective plate 2. The protective plate 2 is additionally provided with a contact surface or edge 29 for the free end of the positioning spring 28 which is equipped with a pressure piece 47.

As is particularly illustrated in FIG. 11, there is provided a stop element 30 which limits the tilting movement of the protective plate 2 afforded by the positioning device 27, and thereby maintains the protective plate 2 in the operative position "a".

In this manner there is achieved a further improved stabilization of the operating position "a" of the protective plate 2. As FIGS. 10 and 11 indicate, the stop element 30 is formed by a suctioning device 32 which incorporates a suctioning opening 31 serving for the aspiration of suctionable material produced during the processing or finishing of workpieces, wherein the protective plate 2, due to the positioning device 27, lies close against the suctioning device 32 and securely guides the suctionable material into the suctioning opening 31. The above-mentioned close contact can be improved still further when the stop element 30 is formed by a bar-shaped projection 33 of the suctioning device 32.

Provided on the protective plate 2 is also a tilt-limiting element 34 which cooperates with the extension arm 25, which is arranged on a retainer bar 48 for the protective plate 2 which also includes the stop surface 29. The tilt-limiting element 34 comes into effect when the protective plate 2 is moved away from contact against the stop element 30; in effect, has left the operating position "a".

The pivoting plane 35 of the pivoting arm 4 can extend vertically, or especially as shown in FIG. 1, can be angled relative to the vertical by about 10° to 30°. The above-mentioned angled arrangement, upon assumption of the operating position "a", assists in the close contacting of the protective plate 2 against the suctioning device 32. The extension arm 25 essentially subtends an angle of somewhat greater than 90° with the protective plate 2.

As illustrated in FIG. 2, the minimum value $F_{min}$ of the braking force of the pivoting arm 4 in the upwardly directed position, corresponds to that of a position of the pivoting arm 4 at only a slight distance h from the contact of the protective plate 2 against the stop element 30. Hereby, there is achieved the protective plate 2 which is initially in a position corresponding to the maximum value $F_{max}$ of the braking force, will after encountering a pushing or shoving by hand, and upon reaching of a minimum value $F_0$, practically swing downwardly by itself under the influence of its own weight, in view of which upon assumption of the operating position "a", there is further improved the closeness of contact against the suctioning device 32. The upward movement of the protective plate can be correspondingly simply effected.

As is particularly indicated in FIG. 3, the maximum value $F_{max}$ of the braking force is present within a range which, from the upwardly directed position of the pivoting arm, deviates from the zero position by about 30° to 80°, and is essence on that side of the zero position in which there is arranged the suctioning device, offset relative to the equipment stand 24, and there can be present an intermediate parking position, and moreover also on the oppositely located side of the zero position in which there is present the final parking position "b". FIG. 3 further illustrates the gradual transition which is present between the braking force values of $F_0$ and $F_{max}$.

What is claimed is:

1. In a work location for the processing or finishing of workpieces; a holder, a protective plate supported on said holder for movement between a work position screening an operating person and non-screening parked position; braking means operatively associated with said holder for maintaining the protective plate in a predetermined position; the improvement comprising: said braking means possessing a braking force having a maximum value $F_{max}$ is at least one predetermined position of said protective plate, and a minimum vlaue $F_{min}$ in at least one other predetermined position of said protective plate, said holder including a pivoting arm having two parallel arms forming a parallelogram linkage and supporting said protective plate at one free end of said arm, said braking means being operatively associated with at least one of the parallel arms and with at least one pivoting axle of the parallel arms, said pivoting axle being secured with an associated parallel arm against rotation, said braking means comprises two mutually contacting disc-shaped braking members, said braking members being ring-shaped brake discs arranged on the pivoting axle, one said braking member being secured against rotation relative to said at least one parallel arm and the other said braking member being rotatable with said pivoting axle, the pivoting axle including two axially spaced stops secured to said axle against rotation, said braking members being arranged between said stops, and said stops include radial pins radially extending through the pivoting axle.

2. A work location as claimed in claim 1, wherein the end of the pivoting arm distant from the protective plate is articulated to an equipment stand.

3. A work location as claimed in claim 1, wherein the braking means is operatively associated with one of the pivoting axles of the parallel arms.

4. A work location as claimed in claim 1, wherein the pivoting arms extend horizontally or is slightly angle relative to a horizontal axis.

5. A work location as claimed in 1, wherein an end surface of said one braking member facing towards one of said stops contacts said stop during rotation of the pivoting axle effecting an axial displacement of said one braking member, said surface including wavilinear sequences of protuberances and depressions.

6. A work location as claimed in claim 5, wherein said one braking member includes at least one external axial groove; and a guide pin engaging into said groove forming a securing means against rotation.

7. A work location as claimed in claim 6, wherein said guide pin is arranged on the internal wall of a housing receiving said pivoting axle and braking members.

8. A work location as claimed in claim 7, wherein an extension arm extends from the housing, said extension arm supporting the protective plate at its free end.

9. A work location as claimed in claim 1, wherein a layer of a braking material is positioned between the mutually contacting surfaces of said braking members.

10. A work location as claimed in claim 9, wherein the braking material layer is secured against rotation to said one braking member.

11. A work location as claimed in claim 1, wherein the braking member rotatable with said pivoting axle is secured against rotation but axially movable in conjunction with the stop which is associated therewith.

12. A work location as claimed in claim 11, wherein the ring-shaped braking member rotatable with the pivoting axle includes at least one internal radial groove engaged by the stop associated with the braking member to be rotatable in conjunction with the pivoting axle.

13. A work location as claimed in claim 12, wherein two diametrically oppositely located elongated apertures comprise radial grooves in the ring-shaped braking member rotatable with the pivoting axle.

14. A work location as claimed in claim 1, comprising a spring biasing said two braking members towards each other.

15. A work location as claimed in claim 14, wherein said spring comprises a compression spring acting on a free end of the braking member which is rotatable with the pivoting axle.

16. A work location as claimed in claim 14, comprising means for adjusting the force of said spring.

17. A work location as claimed in claim 16, wherein said adjustable means comprises a turn ring screwed into the housing, said means acting on the spring through the inner race of a ball bearing of the pivoting axle.

18. A work location as claimed in claim 1, wherein the holder includes forwardly tiltable positioning means for tilting the protective plate forwardly about a horizontal tilt axis at the upper region thereof.

19. A work location as claimed in claim 18, wherein a tilt limited element is arranged on the protective plate for cooperation with the extension arm.

20. A work location as claimed in claim 18, wherein said positioning means includes a positioning spring for effecting the displacement of the protective plate.

21. A work location as claimed in claim 20, wherein the positioning spring comprises a compression spring which is supported on the extension arm; said spring having the free end thereof biasing against the protective plate.

22. A work location as claimed in claim 21, wherein the protective plate includes a contact surface for the free end of the positioning spring.

23. A work location as claimed in claim 18, comprising a stop element for limiting the tilting movement of the protective plate effected by the positioning means and for maintaining the protective plate in the operating position.

24. A work location as claimed in claim 23, wherein the stop element comprises a suctioning device having suctioning opening for the receipt of suctionable material formed during the processing of workpieces, said protective plate in contact with the stop element guiding the suctionable material into the suctioning opening.

25. A work location as claimed in claim 24, wherein the stop element is formed by a proturberance on the suctioning device.

26. A work location as claimed in claim 23, wherein the minimum value $F_{min}$ of the braking force of the upwardly directed position of the pivoting arm corresponds to that of the position of the arm at an only small distance from the contact at the protective plate against the stop element.

27. A work location as claimed in claim 26, wherein the maximum value $F_{max}$ of the braking force corresponds to at least one upwardly angled position of the pivoting arm.

28. A work loction as claimed in claim 27, wherein the maximum value $F_{max}$ of the braking force lies within a region which deviates from a zero position defined by the upwardly directed position of the pivot arm by about 30° to 80°.

* * * * *